United States Patent [19]
Freeman et al.

[11] Patent Number: 5,001,565
[45] Date of Patent: Mar. 19, 1991

[54] BLACK LEVEL BACKGROUND COMPENSATION FOR TARGET INTEGRATING TELEVISION SYSTEMS

[75] Inventors: Kenneth B. Freeman, Rolling Prairie; Fred W. Caspari, Michigan City, both of Ind.

[73] Assignee: Dage-MTI, Inc., Michigan City, Ind.

[21] Appl. No.: 530,227

[22] Filed: May 30, 1990

[51] Int. Cl.$^5$ .......................................... H04N 5/335
[52] U.S. Cl. ............................ 358/213.16; 358/221; 358/211
[58] Field of Search .................. 358/213.16, 221, 211, 358/29 C, 213.19, 163, 167, 168, 909

[56] References Cited

U.S. PATENT DOCUMENTS

| | | | |
|---|---|---|---|
| 4,218,699 | 8/1980 | Dischert | 358/29 C |
| 4,638,350 | 1/1987 | Kato | 358/29 C |
| 4,907,084 | 3/1990 | Nagafusa | 358/213.16 |
| 4,912,558 | 3/1990 | Easterly | 358/213.16 |

OTHER PUBLICATIONS

Dage-MTI, Inc.-Service Manual, 68 Series Camera MK II-Issued Nov. 1988.

Primary Examiner—John K. Peng
Assistant Examiner—Sherrie Hsia
Attorney, Agent, or Firm—Richard G. Kinney

[57] ABSTRACT

A system and method of automatically deriving and using a black level control signal for use in long term target integrating camera systems is disclosed. The method employs the steps of, sequentially, first operating the camera in a long term target integration manner at a pre-selected exposure time and detecting and holding the inverse peak level of the television video signal derived from this scan taken from the central portion of the target, generating a corrective signal from the held inverse peak level and applying that corrective signal to the camera while operating the camera for long term target integration periods in essentially the same manner and exposure time to produce a corrected television scan signal, and using that corrected signal to reproduce an image. A television camera system is disclosed for automatically implementing this process, which system includes a vertical interval control circuit responsive to a time selector and start input to generate the control signals to the camera for gating off the scan, a first scan signal, gating signals (using flip-flops driven from the horizontal and vertical scan signals) and gates to feed only the video signals from the central portion of the scan raster to an inverse peak and hold circuit which develops the corrective signal, and the second scan signal so that the corrective television signal can be generated and recorded or otherwise employed.

15 Claims, 12 Drawing Sheets

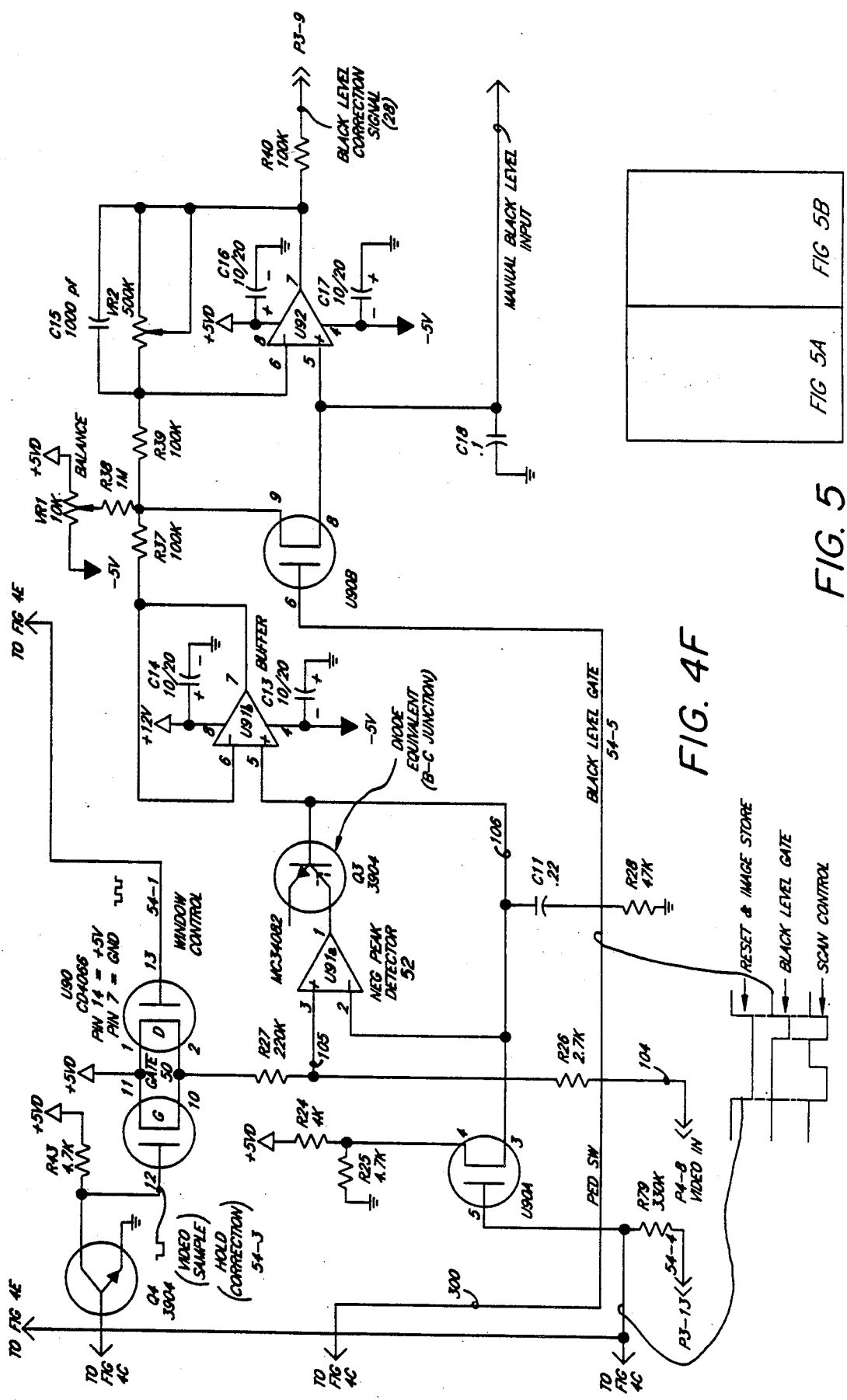

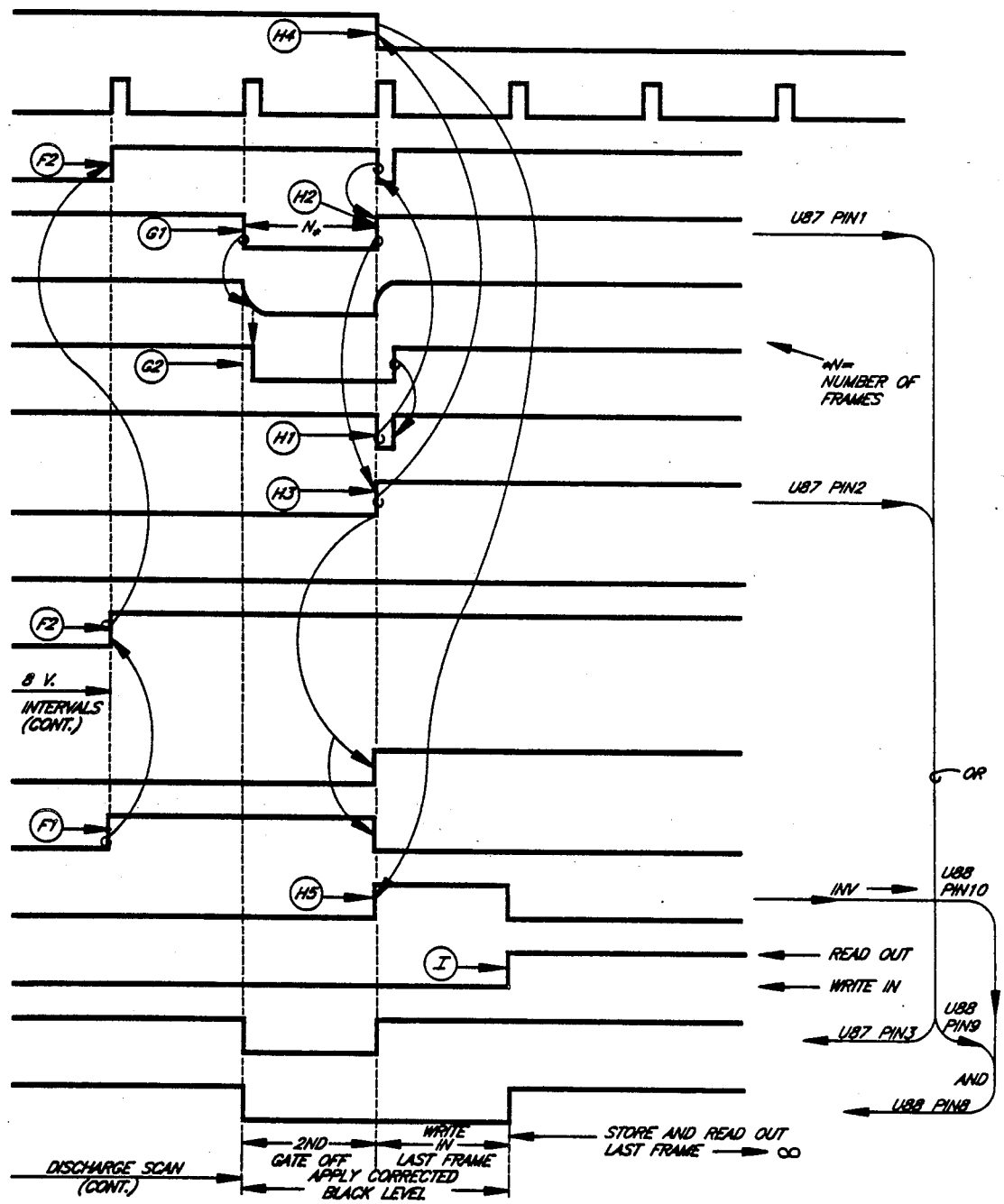

BLACK LEVEL BACKGROUND COMPENSATION FOR TARGET INTEGRATING TELEVISION SYSTEMS

FIELD OF THE INVENTION

This invention relates to Black Level control of target integrating television camera systems.

BACKGROUND OF THE INVENTION

Scan gated television cameras, for example, vidicons, orthicons, and solid state arrays are employed in a number of applications wherein the exposure time of the camera (the time between scanning) is increased to relatively long times to compensate for low light levels or to detect low light emissions. For example, in viewing of microscopic living cells through a microscope lens system, low light levels may be required to prevent or delay light-induced changes in the cells. It may also be desirable to detect and image low levels of light emission from the cells, such as phosphorescence. In such circumstances, the camera shutter is "opened" (by scanning the image sensor to discharge its surface) and light is allowed to impinge on the camera's photosensitive surface for a longer period than is normal, for example, for a full second. This in effect integrates the light received by the camera over that second, and the scan signal output "takes" an image which is the result of the long time exposure. Thus, as with a long time exposure of a photographic camera in a dark room, a useful image can be produced.

This method of operating a television camera is termed in the art "long term target integration," and control systems are commonly available for operating the camera in this way. One such prior art system is that commercially available from the assignee of this invention, DAGE-MTI, Inc., and known as the SIT66G Model and what is described in Service Manual No. 970268-05 published by DAGE-MTI, Inc. in November, 1988. (A copy of this publication should be available in the Technical Library of the Patent and Trademark Office and should be found in the file wrapper of this patent.)

A problem in this and other known such television camera systems which are used in long term target integration is that the black picture level current increases during integration and it is difficult or impossible to be determined in advance. The difficulty in determining or predicting this level is that it results from the combination of the image sensor dark current which is highly temperature dependent, stray background illumination such as camera filament leakage and light scatting within the optical imaging system, and perhaps other factors which can vary from one application to another. Nevertheless, it is desirable to attempt to counteract this increase in black level so as to produce a picture with good contrast and detail.

In previous systems, this compensation was achieved by a trial and error approach. That is, by setting the picture black level to a predetermined position which is lower than the normal non-integrated setting, then integrating for the period desired, reading, storing and viewing of the resultant video picture information, and then resetting the picture black level control slightly toward the anticipated correct setting and repeating this process until a satisfactory picture black level is achieved. This process is, of course, inexact and time consuming.

SUMMARY OF THE INVENTION

In order to optimize the black level setting of such long term target integration television camera system, the present invention provides a process or method which provides the following steps in sequence. First, take a long term target integration scan picture of a particular object and develop a television's scan signal from it. Thereafter, detect the inverse peak level of that television scan signal corresponding to the central position of target. Then, generate a corrective signal to counterbalance the detected inverse peak level, store this signal and thereafter apply the corrective signal to the camera while taking future target integration scan pictures of the same object without otherwise changing the camera system and produce corrected television scan signals. And finally, use said corrected television scan signals to reproduce images of said target.

A television camera system constructed in accordance with the principles of the present invention would include means for gating off the scanning of the target of the camera for a pre-selected period of time $t_s$ while allowing light from an object to impinge on the target to create a long term integration video picture. The system would further include means for scanning the target and producing a composite video signal including scan signal component and video signal components; also, means for selecting from the composite video signal only the video signal components from the central area of the target, means for deriving from said selected video signal components a signal representative of the inverse peak thereof and creating and holding an error correction signal, and means for applying the error correction signal to the camera so as to correct the black level error.

The invention, together with further advantages and features thereof, may best be understood by reference to the following description taken in connection with the accompanying drawings, in the several figures of which, like reference numerals identify like elements.

DETAILED DESCRIPTION OF A PREFERRED EMBODIMENT

The following is a detailed description of one preferred specific embodiment. It should, of course, be borne in mind that the invention is broader in scope than this example and may be practiced in many other specific forms and embodiments.

Figure 1:
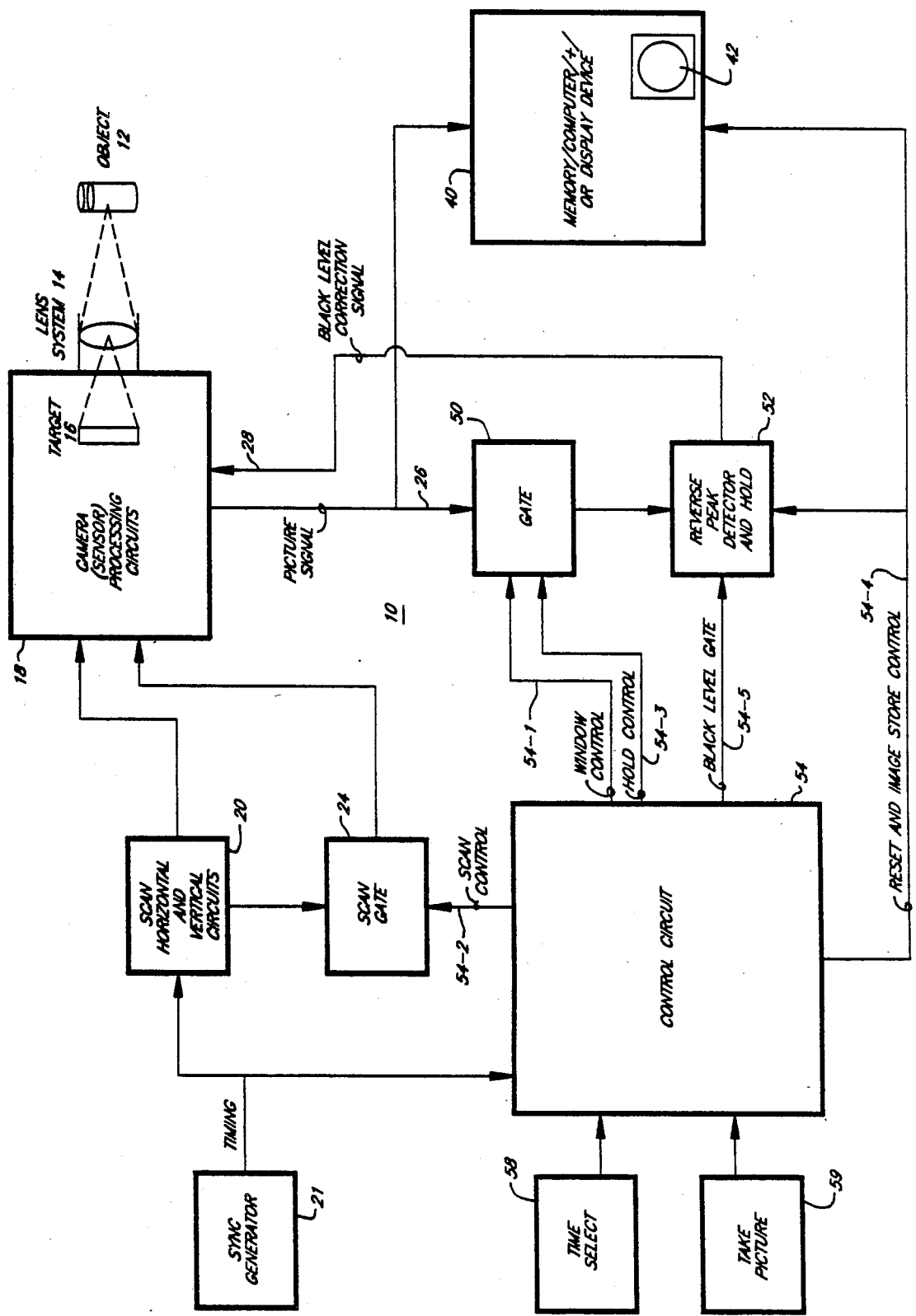
FIG. 1 is a block diagram of a television system constructed in accordance with the present invention.

Referring to FIG. 1, there is a simplified block diagram of a television system employing the present invention. The overall system is given the number 10. The system 10 serves to take a picture of an object 12, which may be a test tube such as is depicted in FIG. 1 or any other subject of which the user may wish to take a long term integration scan.

The light from the object 12 is passed through a lens system symbolized by the lens 14 to a target 16 within an image sensor which in this case is a camera tube and assorted circuitry 18. The image sensor 18 could be any other type of scanning image sensor which is now known or may be later developed which develops a variable dark level or "dark current" signal under different conditions, which signal may be corrected to improve its video output signal. As is conventional, horizontal and vertical sweep signal generating circuits 20 are provided for developing the sweeping of the image sensor 18 across the target 16 in a predetermined pattern called a "raster." These circuits 20 are driven from a sync generator 21 which is often termed a clock and serves to provide timing signals for the system.

The scan of the target 16 is gated on or off by a scan gate circuit 24. This gate is controlled to achieve long term target integration.

The output picture signal from the image sensor 18 is taken from a line designated 26. The signal on line 26 is derived from the discharging of the target 16 during scan and is related to the quantity of light from the object 12 which has struck each of the succession of spots on the target 16 which are swept by the scan.

As mentioned before, the output from the target also includes a "dark current" which is variable. This is termed a "dark" current because it is the signal produced by sweeping spots which have (or should have) received little or no light. That is, the dark part of the picture. To obtain a picture with a maximum contrast and definition, it is desirable to apply a negative dark current signal to offset or cancel out the natural dark current signal. Thus, most conventional commercial cameras include a "set black level" input 28 which receives a signal and generates a negative dark current signal in response to it which ideally would exactly cancel out the dark current.

The video output signal from the camera and circuitry 18 is fed over a line 26 to a conventional memory/computer and/or display device 40 which preferably includes a CRT output unit 42.

The system 10 as so far described may be entirely conventional and thus need not be detailed further here.

In accordance with the present invention, the system 10 also includes a gate 50 for gating the picture signal from output 26 to a reverse peak detector and hold circuit 52.

The gate 50 and detector and hold circuit 52 are controlled by a control circuit 54 which also generates the target integration signal input 54-2 to the scan gate 24. The control circuit 54 responds to two variable inputs: a time selector 58 and a take picture input 59. (These are normal selector means, such as a dial and a push button switch, operated by the user of the system 10 or controlled by external remote commands.) The circuit 54 also employs a timing input from the sync generator 21 and produces outputs on lines 54-1, 54-2, 54-3, 54-4 and 54-5.

The output on line 54-1 is a window control which serves to gate on and off the gate 50 so as to select only the central portion of a picture from the picture signal, as will be explained below. The line 54-2 serves to control the scan gate 24 so as to turn on and off the scan at the desired times. The line 54-3 also serves to control the gate 50, but is operated "on or off" for a full scan. In effect, it selects to operate or not operate the reverse peak detection and hold circuit 52. These inputs 54-1 and 54-3 are connected in a logical "and" manner. Only if both lines 54-1 and 54-3 signal "on" is the picture signal fed through gate 50 to the circuit 52.

The output on line 54-5 is a "black level gate" signal which serves to switch the black level correction signal on line 28 between a more or less conventional black level control configuration and automatic corrected black level in accordance with the present invention. The output on line 54-4 serves to instruct or enable the unit 40 to store the corrected black level image received on line 26, and to reset the peak detected signal to its initial state.

In operation, in accordance with the present invention (assuming the system's components are powered up and running normally, so that the target is being swept normally by the scan raster), the user sets the desired time exposure on selector 58 (e.g. one second) and, when the object 12 is properly positioned, presses the push button or other take picture input unit 59. The control circuit 54 then controls the scan gate to block or stop the scanning of the target for the desired time period (one second in our example) and then gates it "on" for one full "read" sweep of the raster followed by a number of full raster sweeps sufficient to fully discharge the target 16.

The control circuit 54 gates the output signal on line 26 corresponding to only the central area of the target of the read raster sweep to the reverse peak detect and hold circuit 52. This reverse peak detected signal from the central area of the read sweep is detected and held in circuit 52. This signal is then employed to develop a corrected set black level signal on input 28 to the black level offset of the camera 18, and is stored (held) at this level for black level correction. The camera target 16 is preferably discharged by a series of sweeps and then sweeping blocked by scan gate 24 for an integration period equal to the first integration period and a second read scan is run while applying the stored corrected set black level. The control circuit 54 causes this second read raster sweep picture signal to be stored within unit 40. (The output unit 40 may be a memory device such as a VCR, the memory of a computer and/or a display device such as the CRT 42 depicted in FIG. 1, or any other arrangement for the storage and use of the long term target integration picture information.)

Figure 2:
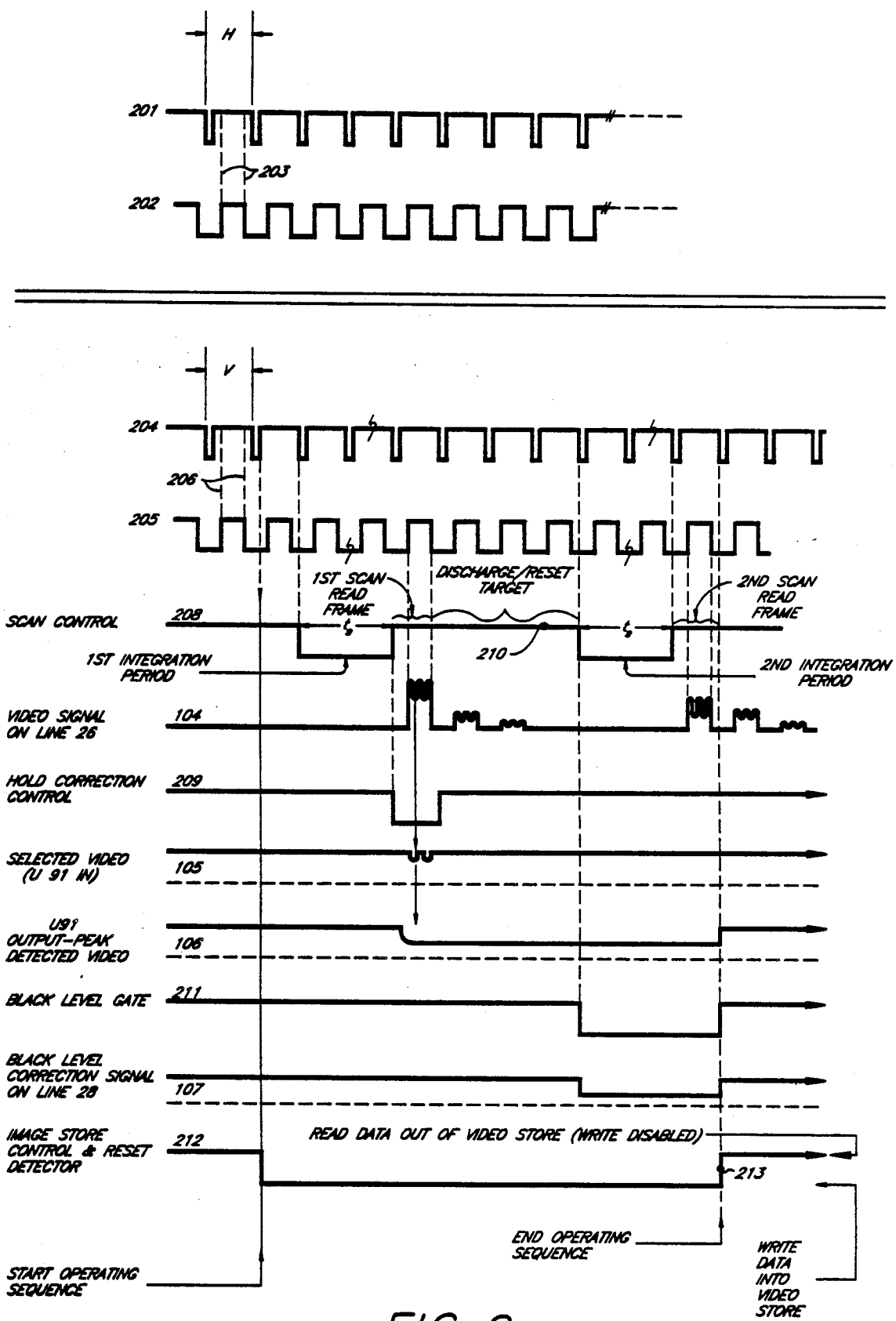
FIG. 2 is a timing diagram of waveforms useful in explaining the operation of the system of FIG. 1.

The operation of the system 10 may be appreciated better from FIG. 2, wherein the top two waveforms are on one scale, the horizontal time rate, the horizontal timing period H (e.g. typically 15,750 horizontal line scans per second, or H = 1/15,750 of a second), and all of the other waveforms are scaled to the vertical timing period V (e.g. typically 30 vertical scans per second, or V = 1/30 of a second). The top waveform 201 of FIG. 2 is the conventional horizontal pulse drive derived from conventional scan circuits 20 (FIG. 1). The second waveform 202 is the horizontal window control signal on line 54-1. As indicated by the dashed lines 203, the result of a logical "and" gating of the two signals by the gate 50 is to pass through the gate 50 only the central portion of each horizontal line.

Figure 3:
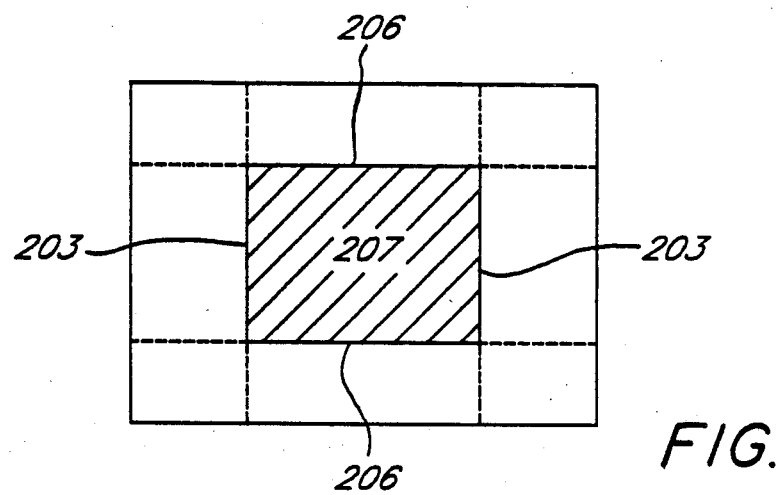
FIG. 3 is an illustration of a raster and of a portion of the raster selected by the inventive system.

FIG. 3 represents a rectilinear raster scan image, wherein the outer border is the full raster. The effect of the signal 202 is to eliminate that portion of the raster to the outside of the lines 203 so that only the portion between those lines is selected.

Referring again to FIG. 2, and the second set of waveforms therein, the waveform 204 of this set is the conventional vertical drive signal. A second gating signal, the vertical window control signal 205 is shown below it. This signal serves to "and" gate the vertical raster signal in the same manner as the signal 202 does to the horizontal. That is, as indicated by the lines 206 in FIGS. 2 and 3, only the central portion of the vertical signal is selected.

Referring again to FIG. 3, the effect of the vertical window signal is to select that portion of the raster between the horizontal lines 206 and thus only the shaded area 207 is selected or passed through the gate 50 of FIG. 1 to be received by the reverse peak detector and hold circuit 52. The operation of circuit 52 will be explained in more detail below in relation to the discussion of FIG. 4.

A full cycle of the operation of the system 10 is illustrated in FIG. 2. (For ease of illustration, long trains of pulse have been omitted, as indicated by the break lines in signals 204 and 205.) The scan gate 24 of FIG. 1 is controlled by the signal on line 54-2 which is represented by the waveform 208 of FIG. 2. After the target 16 has been discharged, this signal is lower during the integration period $t_s$ (e.g. one second, or 30 frames). With the period $t_s$ run out, the scan control signal rises (at the start of a vertical scan period) and the target is again scanned.

A hold correction signal waveform 209 is generated on line 54-3 of FIG. 1. The effect of this signal together with that of signals 205 and 202 is to pass through the video information of area 207 of FIG. 3 from the first scan through the gate 50 of FIG. 1 to the reverse peak detector and hold circuit 52.

As indicated by waveform 208, the target 16 is scanned for a number of additional vertical periods (indicated at 210 in FIG. 2) sufficient to discharge or reset the target to a "black" level by discharging any residual charge generated by the long term integration exposure. (In an ideal camera or sensor, these additional scans would not be needed since the first scan would fully discharge the target. But, in conventional present day sensing tubes, these additional sweeps are needed to fully discharge the target.)

After the completion of the discharge/"reset" scans 210, the scan is again turned off for the same long term integration period $t_s$ as was just completed. In our example, this is one second. It can be for whatever time is selected by control 58 (typically 1/15 to 4 seconds). At the conclusion of this period $t_s$, the scan control signal is again gated "on."

At the same time, the reset and image store control signal, as indicated by waveform 212 of FIG. 2, is "on" after completion of the second scan. This signal is coupled over line 54-4 to the unit 40 which stores the output from this second scan waveform. This store signal also resets the detect and hold circuit 52 (at 213 of waveform 212).

To recapitulate the initial steps of the process of the present invention: at the start of the present inventive process, the gate 24 is controlled so as to (after allowing sufficient scans to discharge a target) turn the scan (the electron beam in the case of a tube) "off" for a period of time $t_s$ selected at control 58 by the user of the system 10. Such long term integration periods $t_s$ are typically in the range of 1/15th of a second to four seconds. During this period, the target is exposed to light from the object 12 and the changes at the various spots on the target 16 represent the time integration of the light falling on them from the target over the period $t_s$. During this time, no video signal is developed. At the conclusion of the long term integration period $t_s$, the scan of the image sensor or camera 18 is gated "on," as indicated at waveform 208 of FIG. 2. The center portion of this scan (corresponding to the center of the target) is selected out by gate 50, as shown in FIG. 3. This selected video information is fed to the reverse peak detector and hold circuit 52 (FIG. 1).

Figure 4:
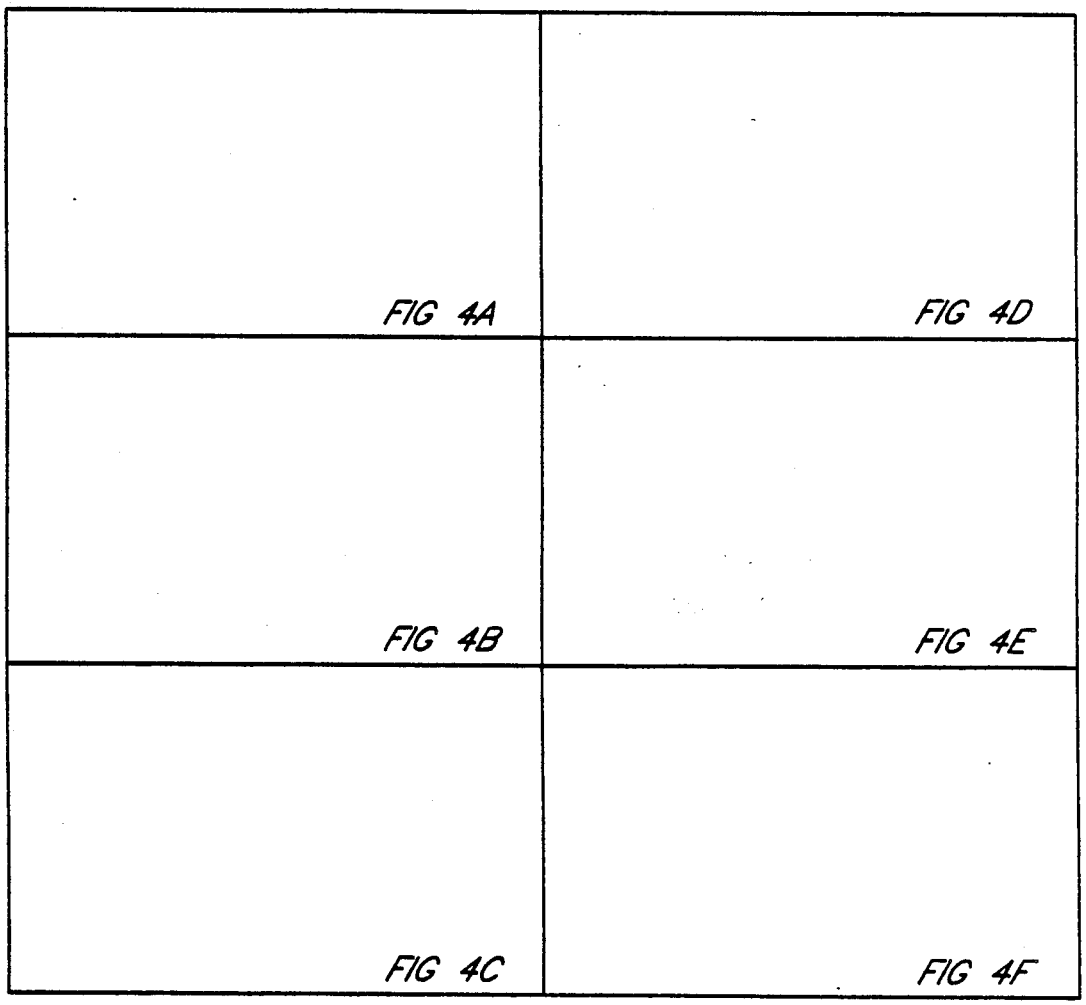
FIG. 4 is a layout diagram of a circuit diagram of a portion of the system of FIG. 1, which circuit diagram is shown in detail in FIGS. 4A–4G.
Figure 4A:
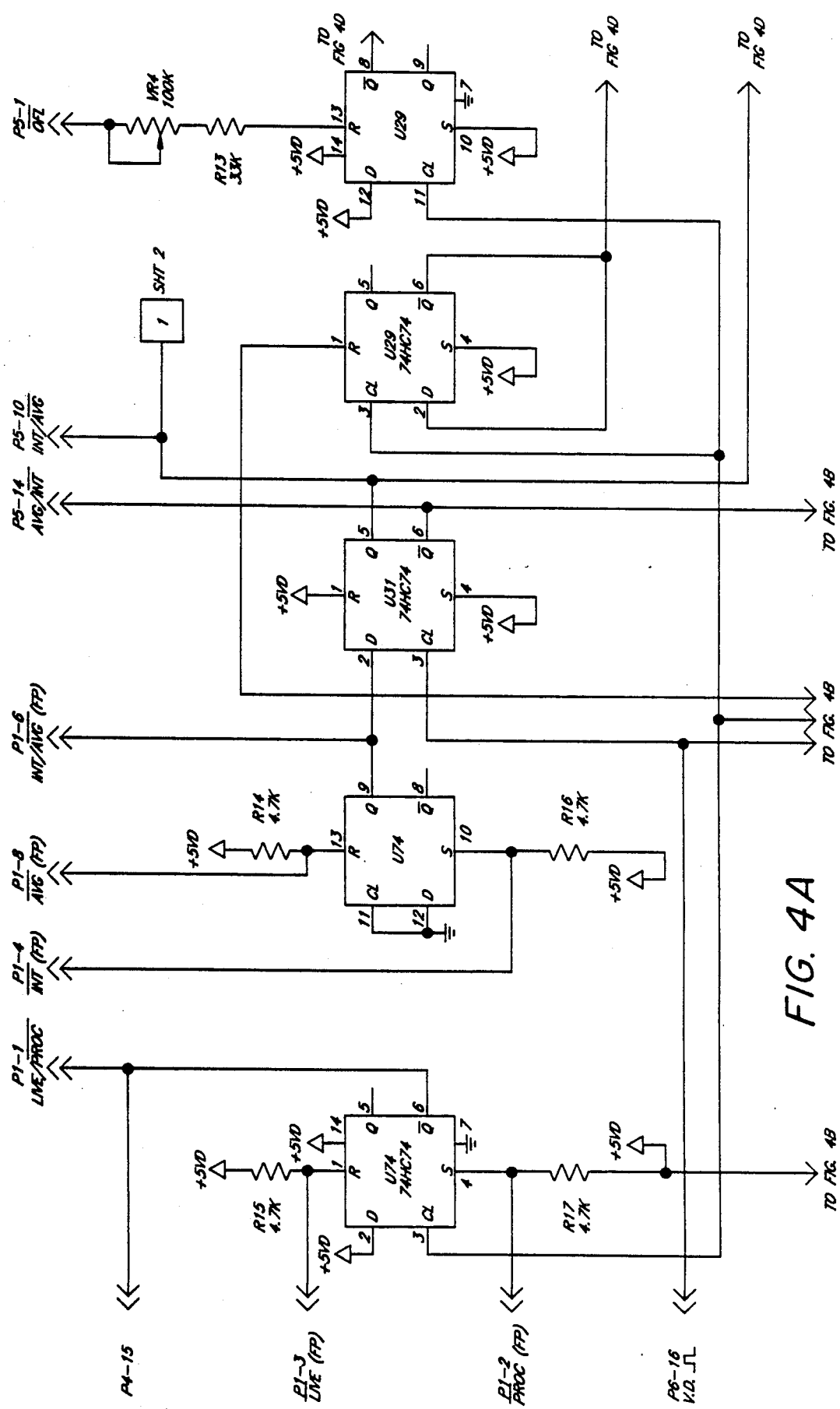
Figure 4B:
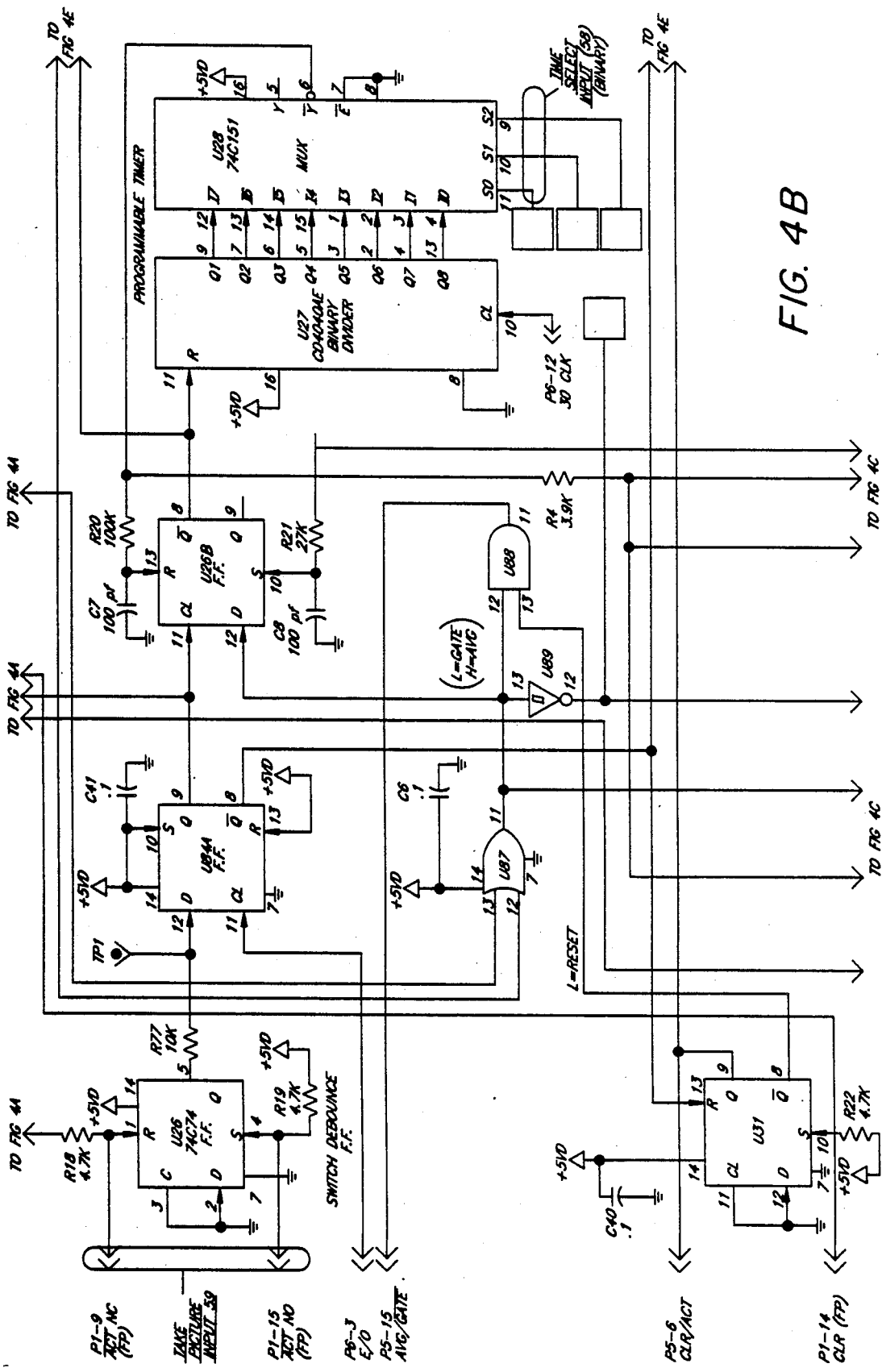
Figure 4C:
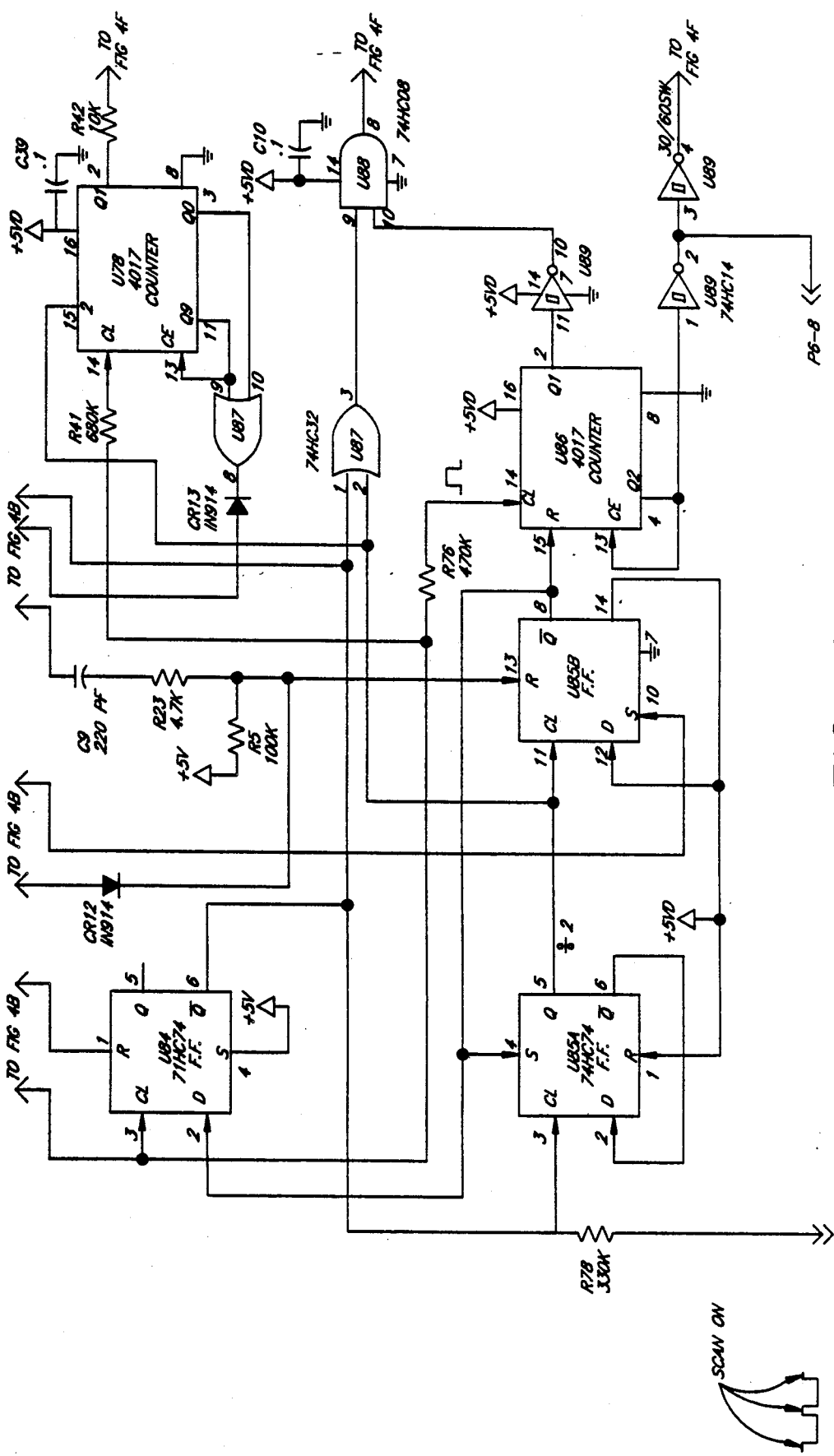
Figure 4D:
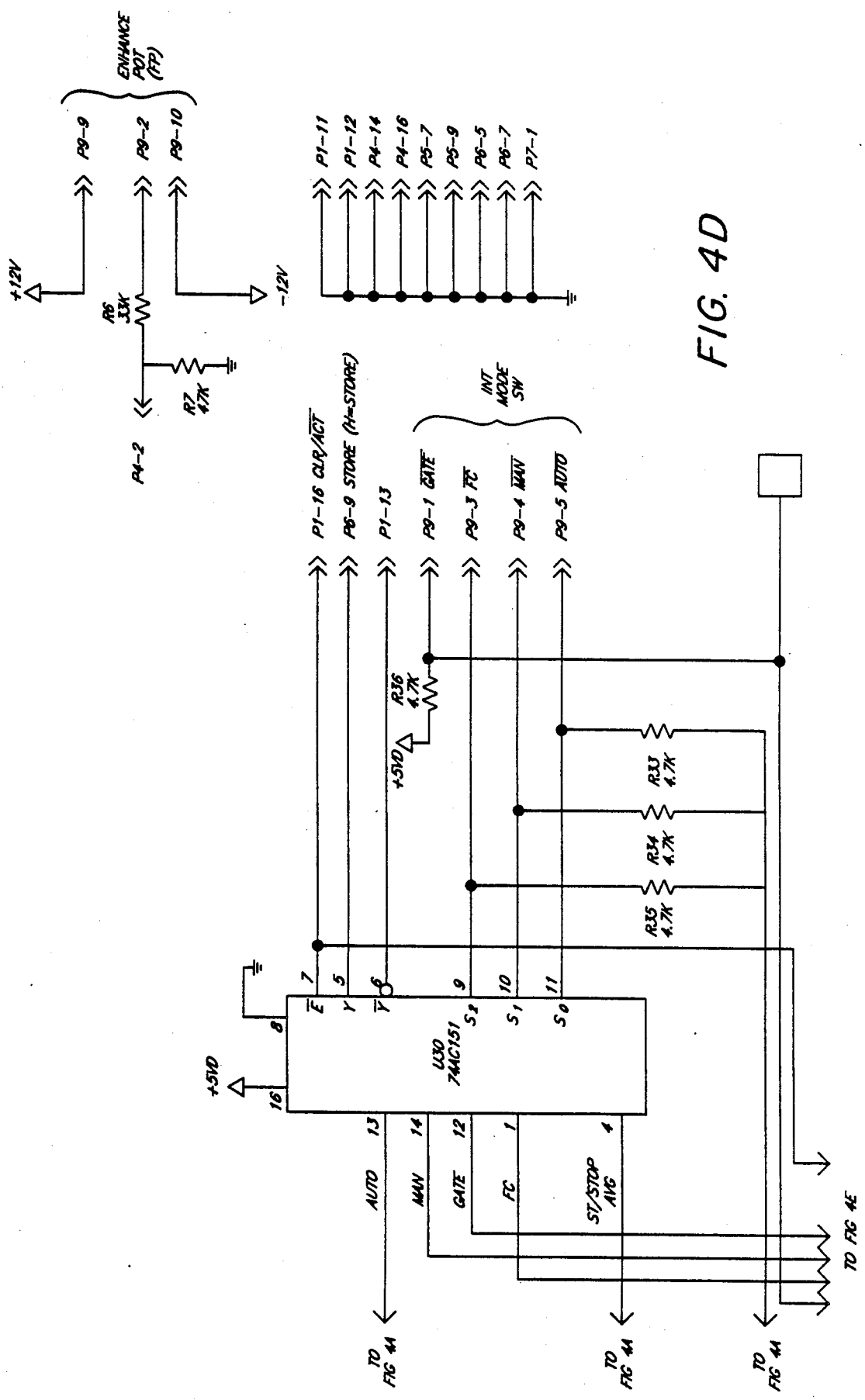
Figure 4E:
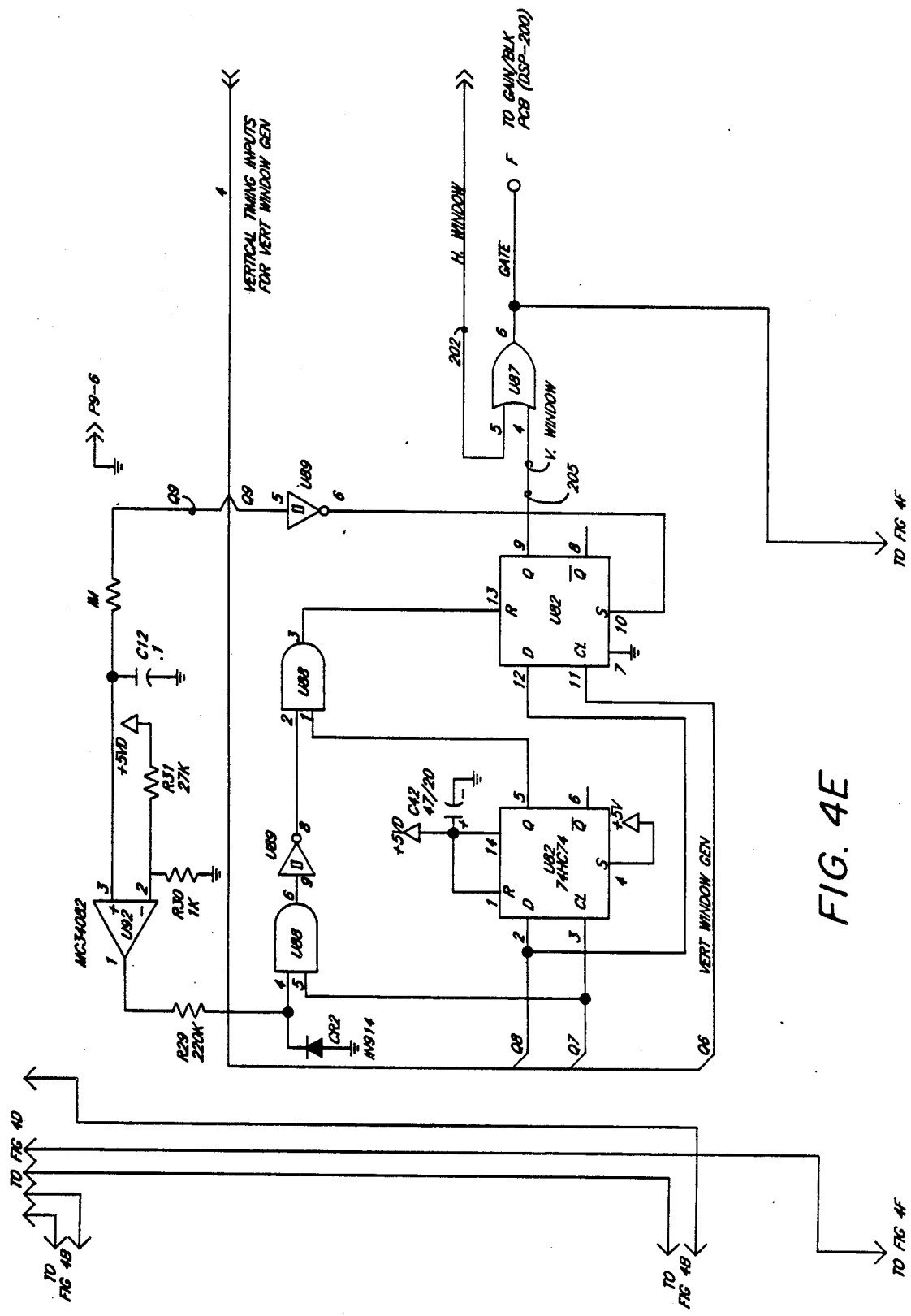

Referring to FIGS. 4 and 4A–4F, and especially FIG. 4F, the gate 50 and the peak detect hold circuit 52 are shown in more detail. The video input is applied at pin P4-8 ("VIDEO IN"). The central portions of horizontal sweeps are selected by gate 50 which includes a field effect transistor FET. This FET is driven by OR gate U87 pin 6 (FIG. 4E) which is fed, over line 54-1, a signal derived from waveforms 202 and 205 (FIG. 2). The video input is depicted in the waveform 104 (FIG. 2) and the gated video input to operational amplifier U91a (FIG. 4F) is shown in waveform 105. The operational amplifier U91a peak detects and holds signal 106 related to the negative peak of the signal 105. This signal is buffered and inverted by the circuits formed by operational amplifiers U91b and U92 respectively and imposed on line 28 (FIG. 4F and FIG. 1) as waveform 107.

FET U90A resets the black level voltage stored on C11, in response to the reset and image store pulse on line 54-4.

FET U90B passes the black level correction signal through on line 28 in response to the black level gate on line 54-5.

The control circuit 54 shown in FIGS. 4A–4F may be resolved into the following components:
(a) a programmable timer which generates the integration interval;
(b) a fixed internal timer which generates the first discharge/reset scan frame interval;
(c) a fixed internal timer which generates black level gate and read/write control signals; and
(d) an assembly of flip flops which control timers and receive inputs from the timers.

The timers are constructed from binary dividers which are clocked from vertical drive pulses.

To assure that operation is initiated coincident with the even field, an even/odd field pulse is used to synchronize and initiate the control timing sequence.

THE PROGRAMMABLE TIMER

The programmable timer (FIG. 4B) is constructed around binary divider U27 whose outputs Q1 through Q8 are individually selected by multiplexer (mux) U28. The inverted output of U28 is used to reset divider U27, thereby terminating the interval. The interval is initiated by removing U27 reset via FF U26B. U26B is a set/reset flop which is set to start the interval and reset, by mux 28, to stop the interval. Interval length is selected by programming mux 28 to select any of the Q1 through Q8 outputs. If, for example, Q1 is selected, one vertical interval will be counted. If Q2 is selected, then two vertical intervals will be counted, etc. Gated SIT Timing Sequence (FIGS. 5A and 5B)

Figure 5A:
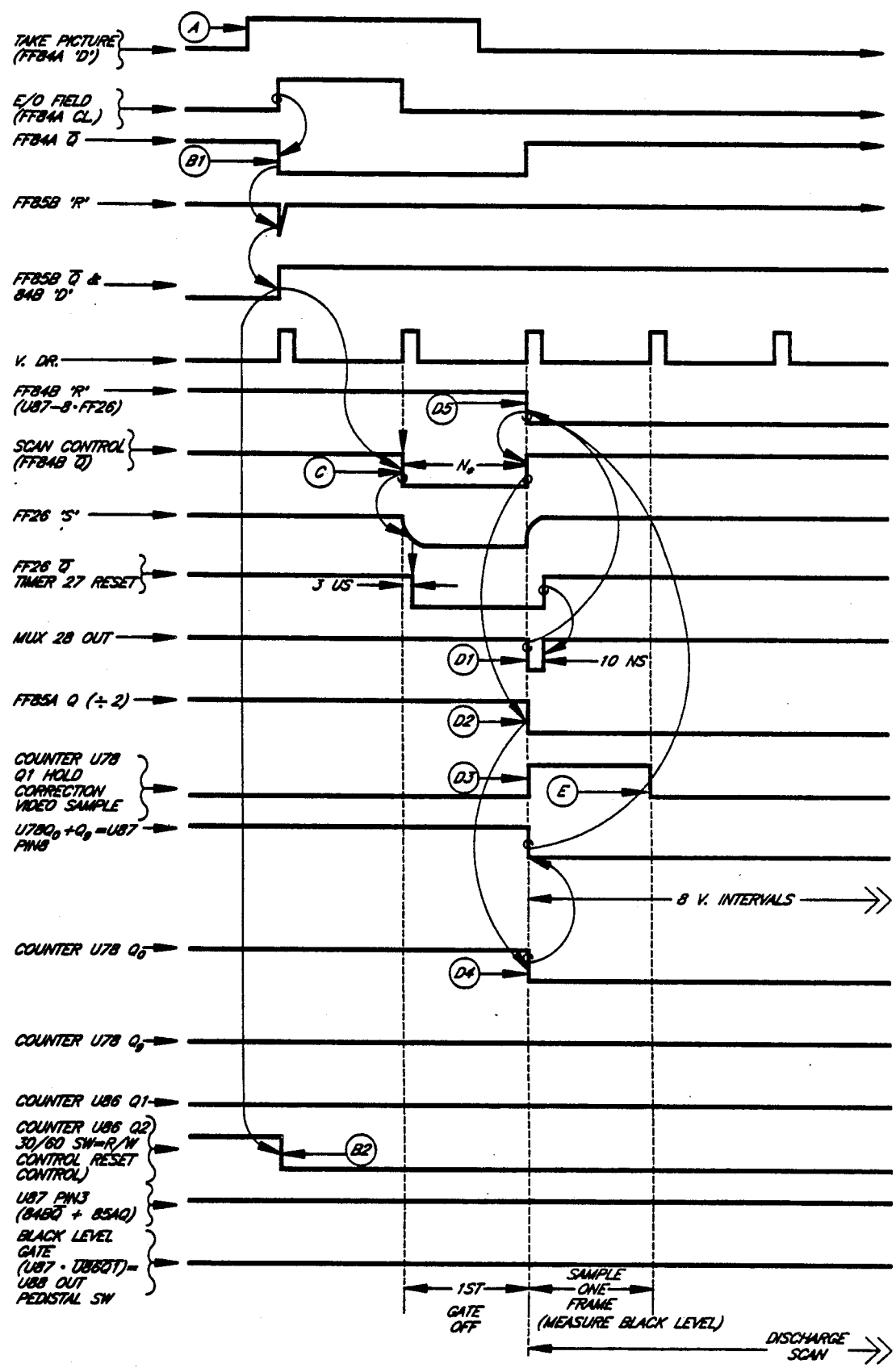
FIG. 5 is a layout diagram for FIG. 5A and FIG. 5B which together constitute a timing diagram of waveforms illustrating the operation of the control timing circuit.

With reference to FIGS. 5A and 5B, the operation is initiated by the take picture input which places a high at the 'D' input of FF 84A at time A. Upon the next positive going edge of the E/O field pulse, the $\overline{Q}$ output of 84A goes low at time B1. This transition resets FF 85B hence 85B $\overline{Q}$ goes high.

When 85B $\overline{Q}$ goes high, it resets counter 86 and places a high at the 'D' input of FF 84B.

Counter 86 was initially set so that its Q2 output is high; when reset, Q2 goes low. This places the read/write control line in the write in state (low), thereby initiating the gating sequence at B2.

Since FF 84B 'D' input is now high, its $\overline{Q}$ output will go low at the next vertical drive clock (time C).

This sets FF U26B which pulls its $\overline{Q}$ output low, thereby removing the reset from counter 27 which times out 'N' vertical clock pulses later. If 'N' is selected as one, then a negative reset pulse is generated at time D1 from the output of mux 28. This resets FF U26B and FF U84B at D5.

It should be noted that when mux 28 output goes low, FF U84B is immediately reset but FF U26B reset is delayed 10 microseconds by a resistor/capacitor (RC) network, R20 C7. This delay stretches FF U84B reset pulse width, thereby assuring that FF U84B does not respond to the clock input at time D. If clocked, FF U84B would assume the incorrect state at D.

FF U26B set input is delayed by 3 microseconds by R21 C8. This delay assures that counter 27 is enabled *after* the vertical clock at C that initiated FF U26B set. This assures that a full frame is counted. If there were no delay, counter 27 would clock at C instead of D, thereby foreshortening the timing by one vertical interval.

When FF 84B is reset, $\overline{Q}$ output goes high, thereby clocking FF 85A at time D2. FF 85A Q output now goes low in response to the clock input. This removes the reset from counter U78 which now begins counting vertical drive pulses. The first event in this counting sequence occurs at D3 when U78 Q1 goes high. At the next clock pulse, at E, Q1 goes low. The positive pulse from Q1 is inverted by Q4. This generates the video sample.

When U78 reset is removed, U78 Q0 goes low at D4. This applies a reset to U84B through or gate U87 and diode CR13 at D5. U84B remains reset until U78 Q9 goes high at F1, eight vertical intervals after D. At this time, F2, the reset is removed from U84B.

With reset removed and the 'D' input high, FF 84B $\overline{Q}$ goes to ground at the next vertical drive pulse at G1.

The ground from U84B $\overline{Q}$ sets U26B, thereby starting the U27/U28 interval timer which begins the second gate interval at G2.

When the interval timer times out, at H1, the ground pulse from mux 28 resets U84B, causing its $\overline{Q}$ output to go high at H2. This toggles U85A, causing its Q output to go high at H3. This, in turn, clocks U85B, causing its $\overline{Q}$ output to go low at H4. This removes reset from counter 86 at H5 and applies a "set" to FF85A, thereby disabling it for the remainder of the operating sequence.

Now that counter 86 reset is removed, it will begin to toggle on succeeding vertical drive clocks at H5 & I.

The Q1 output of U86 is inverted by U89 and applied to and gate U88 where it is anded with (84B $\overline{Q}$+85A Q) the resultant pulse forms the black level gate.

WINDOW GENERATOR

The window used for gating camera video is generated by combining horizontal and vertical window pulses in an or gate. The horizontal window is generated by a single shot driven by a horizontal rate signal. The vertical window is generated by a pair of 'D' flops (U82) which are clocked from vertical rate pulses. Both horizontal and vertical windows can be supplied from single shots, as should be obvious to those skilled in the art.

Presently preferred components and values are set out in the drawings or here below listed. While the set out and following values and components are believed to be transcribed accurately, the reader is advised to use the well known in the art mathematical and experimental methods to verify these and protect against any errors in transcription. Of course, while these particular components are here identified for particularity, it is to be understood that the invention can be practiced in many ways and with many different components, values or circuit configurations, and that the detailing of this one embodiment does not limit the scope of the invention, nor of the claims appended to this application.

| | |
|---|---|
| FETs | CD4066CN (National) |
| Operational Amplifiers | MC34082 (Motorola) |
| Diode Q3 | 2N3904 (Motorola) |
| | (Using base to collector junction) |
| Resistors R24, R25 | 4.7 KOhms |
| Resistor R26 | 2.7 KOhms |
| Resistor R27 | 3.9 KOhms |
| Resistor R28 | 47 Ohms |
| Resistors R37, R38, R39 & R40 | 100 KOhms |
| Potentiometer VR2 | 1 Meg Ohms |
| Potentiometer VR1 | 10 KOhms |
| Capacitor C11 | 0.22 microfarads |
| Capacitor C15 | 1000 picofarads |
| Capacitor C13, C14, C16 & C17 | 10 microfarads/20V (Sprague) |
| Capacitor C18 | 0.1 microfarads |

While these are preferred values and components at the time of filing this application, it may well be that, based on experimentation and for cost considerations, the present inventors or their assignee may well in the future decide to change these components and the circuit in future commercial embodiments.

ALTERNATIVE MODIFIED EMBODIMENT

Figure 6:
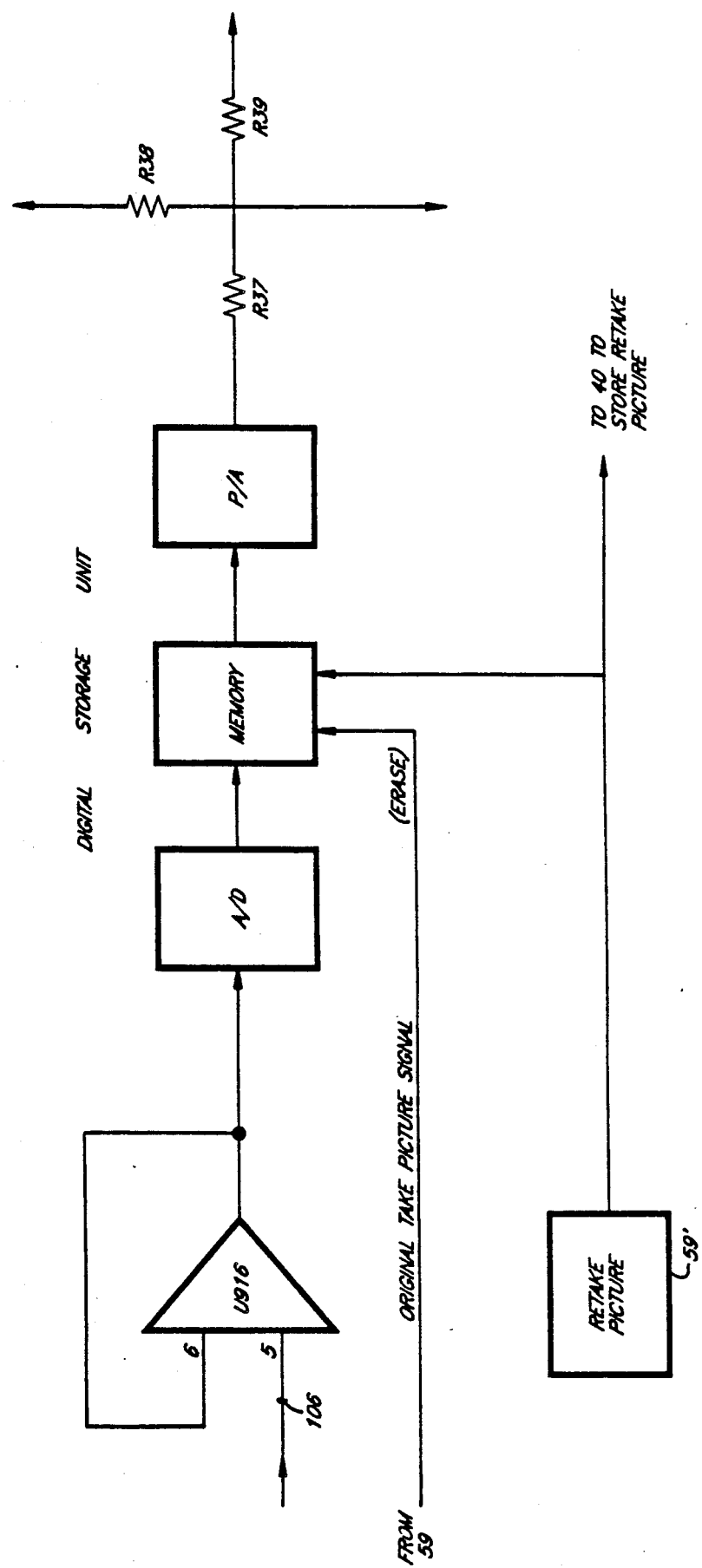
FIG. 6 is a hybrid block and circuit diagram for an alternative or modified construction of the inventive system.

Referring to FIG. 6, an alternative construction for a portion of the circuit of FIGS. 4A-4F is shown. The elements shown in FIG. 6 may be substituted for the buffer including operational U91*b* and its assorted circuitry. In this arrangement, the inputs to U91*b*' pin 5 would be the same as in FIG. 4F but its output would feed to an analog to digital converter A/D. The digital output for converter A/D is stored in a suitable longer term memory circuit MEMORY for which it is reconverted to an analog signal by a digital to analog converter D/A and then fed to one side of the resistor R37. The remaining parts of the circuit would be the same.

Now, this alternative embodiment of FIG. 6 essentially inserts a digital storage unit between the operational amplifier U91*b* and the resistor R37. It would operate essentially the same as the prior embodiment when a single long-term integration picture is desired. However, it allows for the taking of a succession of "shots" e.g. of the same object using the same long-term integration period while continuing to use the initial correction signal (stored in MEMORY) without the need for establishing a new correction value signal.

This arrangement has the signal storage means in digital form rather than the voltage level on a capacitor such as capacitor C11 in the previous embodiment. This provides a more practical longer term memory storage.

In operation, a specific "retake" signal from a source 59' would serve to apply the stored correction signal to the camera and also record or reproduce the retake picture in device 40. The original take picture signal would serve to erase the previously stored correction signal so as to prepare the MEMORY for receiving and storing a new correction signal.

While particular embodiments of the invention have been shown and described, it will be obvious to those skilled in the art that changes and modifications may be made without departing from the invention and, therefore, the aim in the appended claims is to cover all such changes and modifications as fall within the true spirit and scope of the invention.

We claim:

1. In a television camera system of the type which employs long term target integration to develop scan images from a target, which target has a central portion and a peripheral portion, and which camera develops a variable level dark signal under differing operating conditions and has a black-set input, the method of correcting for said variable dark signal comprising the steps of sequentially:
   (a) taking a long term target integration scan picture of a particular object and developing a television's scan signal thereof;
   (b) detecting the inverse peak level of said television scan signal corresponding to the central position of target;
   (c) generating a corrective signal from said detected inverse peak level signal, such corrective signal being such that when applied to the black-set input it counters said detected inverse peak level;
   (d) applying said corrective signal to the black-set input of the camera while otherwise essentially operating the camera system in the same manner as for step (a), while taking another target integration scan picture of said object to produce a corrected television scan signal from said another scan, and
   (e) using said corrected television scan signal to reproduce an image.

2. The method of claim 1 wherein said step (d) occurs in as close a time sequence after step (a) as is practical.

3. The method of claim 2 wherein said long term target integration for steps (a) and (d) is of the order of 1/15th second to four seconds and delay time between the scan of step (a) and step (d) being limited only by the method of holding or storing of the correct set black level value.

4. The method of claim 2 wherein said long term target integration for steps (a) and (d) is of the order of 1/15th second to four seconds and delay time between the scan of step (a) and step (d) is less than four seconds.

5. A television camera system, in combination with a camera having a target on which light images are impressed from an object, and which target is scanned to produce video signal information related to the integration of light falling on successive portions of the target, and which camera is subject to black level error which may be corrected in order to reproduce a better image from the image output, the improvement in means for correcting the black level error, comprising:
   means for gating off the scanning of the target for a pre-selected period of time $t_s$ while allowing light from an object to impinge on the target so as to create a long term integration video picture from the target;
   means for scanning the target and producing a video signal including scan signal component and video signal components;
   means for selecting from the video signal only the video signal components representing video information from the central area of the target;
   means for deriving from said selected video signal components a signal representative of the inverse peak thereof and creating and holding an error correction signal;
   means for applying said error correction signal from said last named means to the camera so as to correct the black level error thereof.

6. The system of claim 5 for a camera whose target is swept in a first primary direction and in a second primary direction by sweep circuitry driven by a first sweep synchronizing signal for establishing the rate and start of sweeps in the first primary direction and a second sweep synchronizing signal for establishing the rate and start of sweeps in the second primary direction, and wherein
   said means for selecting from the video signal only the video signal components representing video information from the central area of the target comprises:
   a first flip flop or bistable coupled to receive said first sweep synchronizing signal and so arranged as to produce a gating output signal delayed from the start of a sweep and which gating output signal is maintained for a period significantly less than one sweep period in the first direction;
   a second flip flop or bistable coupled to receive said second sweep synchronizing signal and so arranged as to produce a gating output signal delayed from the start of a sweep and which gating output signal is maintained for a period significantly less than one sweep period in the second direction;
   gate means for coupling said video signal to said deriving means and coupled to said first and said second flip flop or bistable to receive said first and said second gating output signals, which gate means couples said video signal only if both said first and said second gating output signals are present, whereby only the video information corresponding to the central portion of the sweeps in said first direction and the central portion of the sweeps in said second direction are coupled to said deriving means.

7. A long term target integration television system for for taking long term target integration pictures of an object, comprising:
   a sensor unit which has a target upon which light from the object is focused and means for scanning the target to develope video signal information related to the integration of light falling on successive portions of the target and which unit is subject to black level error, which error may be corrected in order to reproduce a better image, said unit having a video signal output;
   means for controlling the scanning of the target including a scan gate whereby the scan can be gated on and off in response to a scan control signal for desired periods so as to develop a video image signal and discharge image information from said target and also to gate off the scanning of the target for a preselected time $t_s$;
   a peak detect and hold circuit for detecting the lowest value of a video signal fed to it and for holding that lowest value signal and for generating a black level correction signal therefrom;

means coupled to said video signal output of said sensor unit and to said peak detect and hold circuit for selectively gating said signal to said peak detect and hold circuit in response to a window control signal;

an output device having a memory for storing a video image signal, said output device being coupled to the sensor unit to receive and selectively store a video image signal therefrom in response to a received image store control signal; and control means for producing a series of signals for controlling said aforementioned means in response to picture taking cycle start input, said control means generating, in response to a picture taking cycle start input, the following signals:

(a) a scan control signal which is coupled to said means for controlling the scanning, said scan control signal controlling said gate such that it is gated "off" for a pre-selected time $t_s$ and gated "on" sufficient to scan an image and discharge any residual image on said target, and then gated "off" for the same time period $t_s$ and then gated "on" to again scan said target, (b) window control signals which are coupled to said video output gating means, which window control signals cause said gating means to pass only the portion of video information corresponding to the scanned video information from the central area of said target and reject any sweep timing pulses therein, so that peak detect and hold circuit is fed only such central area signals, and (c) a frame store signal which is coupled to said output device, said store signal occurring at the conclusion of said second time period $t_s$;

adjustable means coupled to said control means for selecting said time $t_s$ from the range of 1/15 to 4 seconds; and means for initiating a picture taking cycle coupled to said control means;

whereby said system, in response to said means for initiating a picture taking cycle, at least turns off the scan of said target for a period $t_s$, takes a first scan of said target, derives a black level correction signal from the video information of said first scan corresponding to the central area of said target, turns off the screen for a second period $t_s$ and, while applying that correcting signal to the sensor unit, scans the target again and stores in said output device this later scan.

8. In a television camera system of the type which employs long term target integration to develop scan images from a target, which target has a central portion and a peripheral portion, and which camera develops a variable level dark signal under differing operating conditions and has a black-set input, the method of correcting for said variable dark signal comprising the steps of sequentially:

(a) taking a long term target integration scan picture of a particular object and developing a television's scan signal thereof;

(b) detecting the inverse peak level of said television scan signal corresponding to the central position of target;

(c) generating and storing a corrective signal from said detected inverse peak level signal, such corrective signal being such that when applied to the black-set input it counters said detected inverse peak level;

(d) discharging the target;

(e) applying said stored corrective signal to the black-set input of the camera while otherwise essentially operating the camera system in the same manner as for step (a), while taking another target integration scan picture of said object to produce a corrected television scan signal from said another scan, and (f) using said corrected television scan signal to reproduce an image.

9. The method of claim 8 wherein said step (e) occurs in as close a time sequence after step (a) as is practical.

10. The method of claim 8 wherein said long term target integration of steps (a) through (e) are accomplished and then steps (d), (e), and (f) are repeated while using the same target integration time and the previously stored corrective signal.

11. The method of claim 9 wherein said long term target integration of steps (a) through (e) are accomplished and then steps (d), (e), and (f) are repeated while using the same target integration time and the previously stored corrective signal.

12. The method of claim 8 wherein said long term target integration for step (a) is of the order of 1/15 to four seconds.

13. The method of claim 9 wherein said long term target integration for step (a) is of the order of 1/15 to four seconds.

14. The method of claim 10 wherein said long term target integration for step (a) is of the order of 1/15 to four seconds.

15. A control unit for use with a television camera system of the type which employs long term target integration to develop scan images from a target, which target has a central portion and a peripheral portion, and which camera develops a variable level dark signal under differing operating conditions and has a black-set input, comprising in combination:

(a) means for controlling the camera so as to take a long term target integration scan picture of a particular object and develop a television's scan signal thereof;

(b) means coupled to the camera for receiving said television scan signal and for detecting the inverse peak level of said television scan signal corresponding to the central position of target;

(c) means coupled to said detecting means for generating and storing a corrective signal from said detected inverse peak level signal, such corrective signal being such that when applied to the black-set input it counters said detected inverse peak level; and (d) means coupled to said generating and storing means for applying said stored corrective signal to the black-set input of the camera while operating the camera system to take another target integration scan picture of said object to produce a corrected television scan signal from said another scan.

* * * * *

UNITED STATES PATENT AND TRADEMARK OFFICE
CERTIFICATE OF CORRECTION

PATENT NO. : 5,001,565
DATED : March 19, 1991
INVENTOR(S) : Kenneth B. Freeman; Fred W. Caspari It is certified that error appears in the above-identified patent and that said Letters Patent is hereby corrected as shown below:

Column 6, lines 64 & 65, delete "Gated SIT Timing Sequence
    (FIGS. 5A and 5B)" and, before line 66, add the heading
    --GATED SIT TIMING SEQUENCE (FIGS. 5A and 5B)--.

Column 10, line 50, delete "for".

Signed and Sealed this

Fifteenth Day of September, 1992

Attest:

DOUGLAS B. COMER

Attesting Officer

Acting Commissioner of Patents and Trademarks